United States Patent [19]
Hatton
[11] 3,854,007
[45] Dec. 10, 1974

[54] CONTROL SYSTEM BIDIRECTIONAL INTERFACE

[75] Inventor: Terence J. Hatton, Natick, Mass.
[73] Assignee: The National Shawmut Bank of Boston, Boston, Mass.

[22] Filed: May 21, 1973
[21] Appl. No.: 362,519

[52] U.S. Cl. 178/58 R
[51] Int. Cl. H04l 5/14
[58] Field of Search 178/58 R, 50; 343/178, 343/179

[56] References Cited
UNITED STATES PATENTS

| | | | |
|---|---|---|---|
| 3,529,243 | 9/1970 | Reinol | 343/178 X |
| 3,542,956 | 11/1970 | Sekimoto | 178/58 R UX |

*Primary Examiner*—David L. Stewart
*Attorney, Agent, or Firm*—Joseph S. Iandiorio

[57] ABSTRACT

A control system interface which transfers items of information over a data line between a remote terminal and a multiplexer unit including a first register in the terminal for accumulating an item of information to be transferred to the multiplexer unit and a clock for generating a series of pulses including a synchronizing pulse and a number of transfer pulses; a first driver delivers items from the first register in the terminal to the data line and a second register in the terminal accumulates an item of information received from the multiplex unit over the data line; a first gate enables the first driver and the first register to deliver the item of information from the first register to the data line in response to a first group of the transfer pulses and enables the second register to receive an item of information from the multiplexer unit over the data line in response to a second group of transfer pulses; a second driver in the multiplexer unit delivers an item of information on the data line to the terminal and a scanner in the multiplexer unit receives an item of information from each terminal in sequence; a second gate responsive to the first group of transfer pulses enables the scanner to receive an item of information from the terminal and in response to the second group of transfer pulses enables the second driver to deliver an item of information to the terminal.

3 Claims, 4 Drawing Figures

CONTROL SYSTEM BIDIRECTIONAL INTERFACE

FIELD OF INVENTION

This invention relates to a control system interface between a remote terminal and a multiplexer unit, and more particularly to a synchronous control system interface using a bidirectional data line.

BACKGROUND OF INVENTION

Asynchronous control systems for transferring items of information between one or more remote terminals and a multiplexer unit or other device enable items to be sent by each terminal independently. This approach typically requires that the multiplexer unit or other receiving device operate in two modes: a first, very high speed scanning mode to locate a terminal that needs servicing and a second mode in which a recognized terminal is serviced and requires that some preliminary storage device is provided for holding data until that terminal can be recognized and serviced. Alternatively synchronous systems wherein data is clocked to and from terminals typically require two data lines for separately conducting data in two directions, and a clock line for delivering timing signals to the terminal.

SUMMARY OF INVENTION

It is therefore an object of this invention to provide an improved synchronous control system interface between a terminal and remote receiving device, such as a multiplexer unit, which uses a single bidirectional data line.

The invention features a control system interface for transferring items of information over a data line between a remote terminal and a multiplexer unit. There is a first register in the terminal for accumulating an item of information to be transferred to the multiplexer unit, and clock means for generating a series of pulses including a synchronizing pulse and a number of transfer pulses. First driver means delivers items from the first register to the data line and a second register in the terminal accumulates an item of information received from the multiplexer unit over a data line. First gating means enables the first driver means and the first register to deliver an item of information from the first register to the data line in response to a first group of the transfer pulses and enables the second register to receive an item of information from the multiplexer unit over the data line in response to a second group of the transfer pulses. There is a second driver means in the multiplexer unit for delivering an item of information on the data line to the terminal, and scanner means in the multiplexer unit for receiving an item of information from each terminal in sequence. Second gating means responsive to the first group of transfer pulses enables the scanner means to receive an item of information from the terminal and in response to the second group of transfer pulses enables the second driver to deliver an item of information to the terminal.

DISCLOSURE OF PREFERRED EMBODIMENT

Other objects, features and advantages will occur from the following description of a preferred embodiment and the accompanying drawings, in which.

Figure 1:
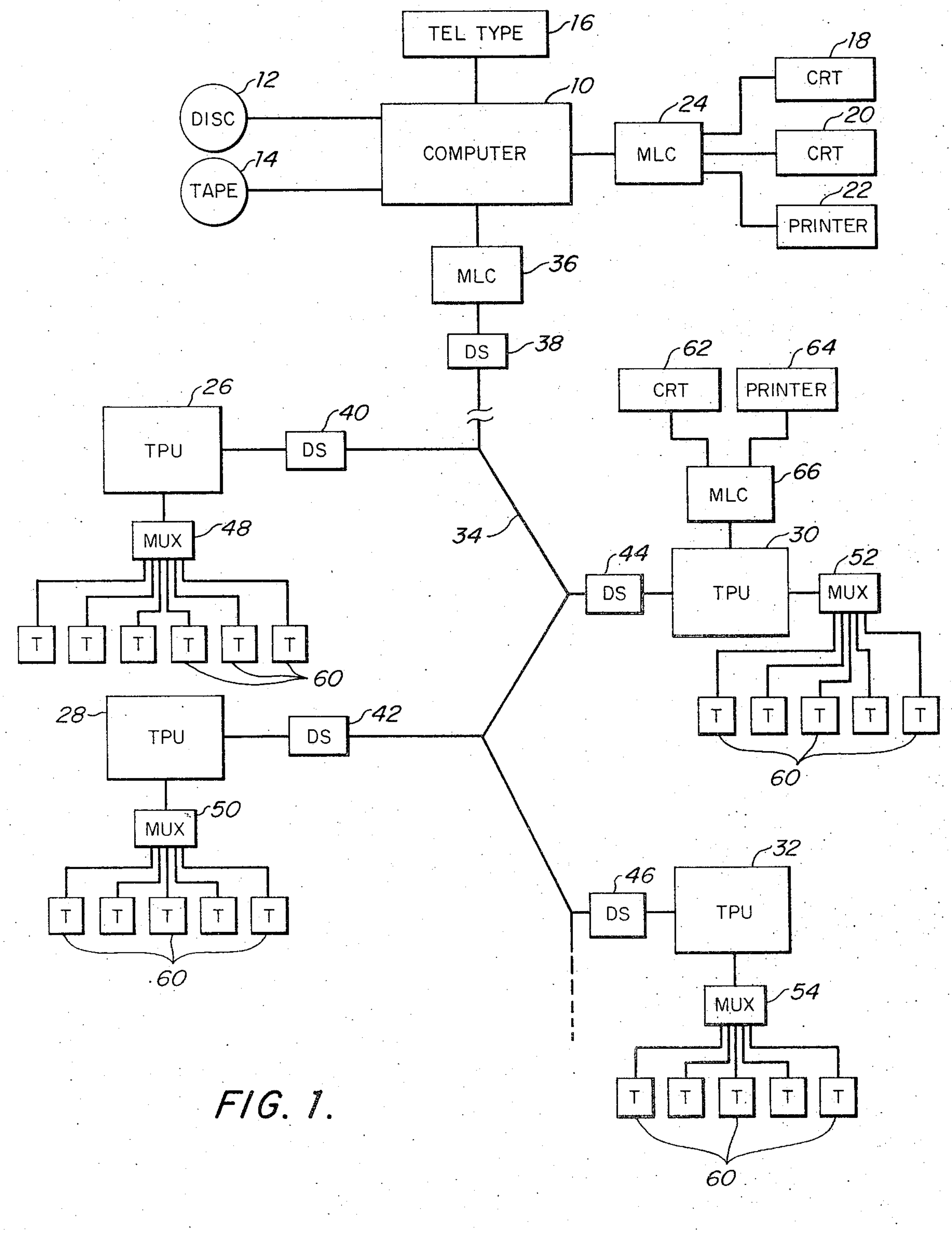
FIG. 1 is a schematic, block diagram of an automatic authorization system in which the control system interface of this invention may be utilized.

The invention may be used in an automatic authorization system such as a credit verification system as shown in FIG. 1, wherein a central computer 10 stores or retains a file on each customer charge account number. A request to computer 10 to check the credit of a particular customer account will cause the computer to call up the file corresponding to that customer account number, and perform a series of data manipulations which compares the present purchase to previous purchasing history with regard to dollar amounts per purchase, dollar amounts per day or week, the type of goods purchased, the frequency of the use of the card and other similar data which would indicate a run-up or other characteristic which may indicate that the card is being used by a credit card thief. Computer 10 typically has a number of peripheral devices such as disc unit 12 and tape unit 14 on which file data may be stored. In addition a TELETYPE 16 may be directly connected to computer 10 and cathode ray tube display units 18 and 20 and a printer 22 may be connected to computer 10 through a multi-line controller 24 to permit the credit manager to be consulted under certain conditions pursuant to which computer 10 is instructed to print out on teletype 16 or printer 22 or display on CRT's 18 and 20 certain information from which the credit manager can make a decision. The decision is communicated to the computer by means of the teletype 16, printer 22 or keyboards which may be associated with the CRT displays 18 and 20 so that the computer can complete its data manipulation and respond to the inquiry which started the processing. Computer 10 typically may be located in the central office of a large chain store from which it communicates with programmable terminal processor units 26, 28, 30 and 32 over telephone lines 34 through a multiline controller 36 and data sets 38, 40, 42, 44, and 46 associated with multiline controller 36 and each of the terminal processor units 26, 28, 30 and 32. Each programmable terminal processor unit may have associated with it one or more multiplex units 48, 50, 52 and 54 each of which may have associated with it a number of terminals 60. In each of the branch stores the programmable terminal processor unit, data set and multiplexer unit would be located in or about the credit department while the terminals 60 would be provided one at each counter where there is a sales person. Each terminal 60 typically includes a keyboard for entering information into the system such as account number, dollar amount and the type of credit card such as the store's own card or Mastercharge, Bank Americard or the like and a display area. Each programmable terminal processor unit is also capable of having associated with it cathode ray tube displays, printers and various other peripheral devices as shown with relation to programmable terminal processor unit 30 which communicates with a cathode ray display device 62 and a printer 64 through a multiline controller 66.

Figure 2:
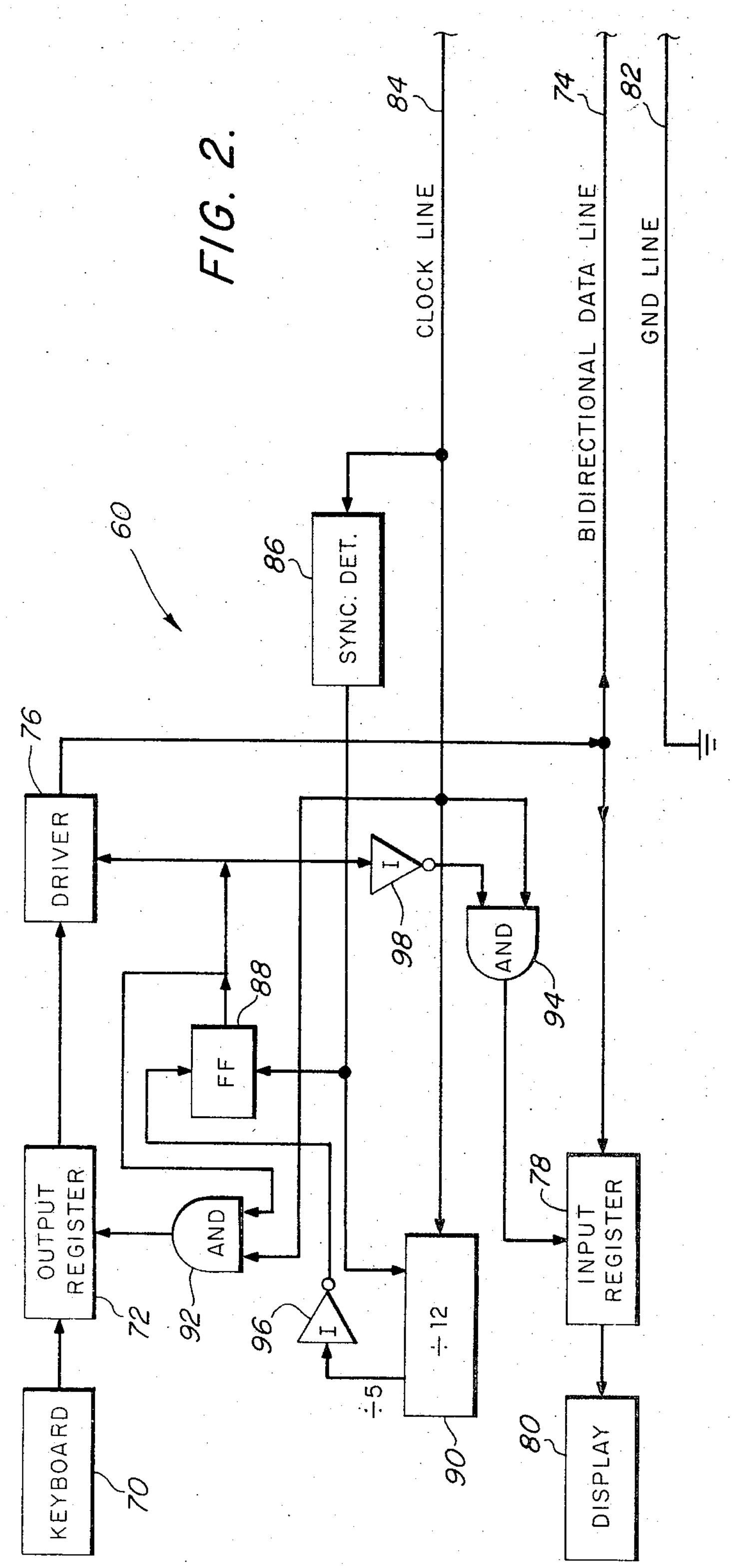
FIG. 2 is a schematic, block diagram of a portion of a control system interface acccording to this invention located in a terminal.
Figure 4:
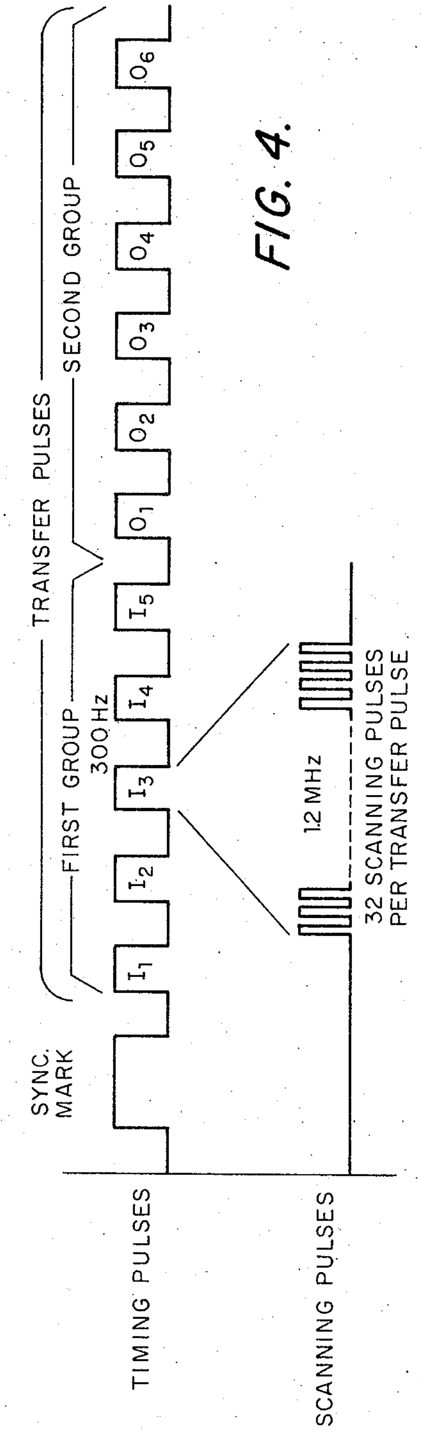
FIG. 4 is a chart showing the timing pulses and scanning pulses which occur in the control system described in FIGS. 2 and 3.

Terminals 60, FIG. 2, may include a keyboard 70 for entering information into the system via output register 72. The contents of output register 72 are delivered to a bidirectional data line 74 by means of a driver 76. Information being received by terminal 60 on data line 74 is stored in input register 78 from which it is introduced into display 80. In addition to bidirectional data line 74 there are two other lines included in the connection between terminal 60 and its corresponding multiplexer or receiving device: ground line 82 and clock line 84. Clock line 84 supplies a series of timing signals which include a synchronizing mark followed by eleven transfer pulses, FIG. 4. The first five transfer pulses are used to clock a five bit item of information at output register 72 through driver 76 onto data line 74 from which it will be delivered to the corresponding receiver device. The remaining group of six transfer pulses are used to read into input register 78 the six bit character being delivered on data line 74 from the receiving device. The extra bit co-incident with the synchronizing mark is not used. Synchronizing mark detector 86 recognizes the synchronizing mark on clock line 84 and resets flip-flop 88 and divide-by-twelve circuit 90; resetting divide-by-twelve circuit 90 sets it to zero; resetting flip-flop 88 sets it to one. The sequence of eleven transfer pulses divided into five "out" and six "in" is purely arbitrary. This scheme is viable for any set of pulses $A_{out} + B_{in} = C_{transfer\ total}$. Thus divide-by-twelve circuit 90 would become a divide-by-[C+1] circuit. With flip-flop 88 reset a signal is provided to driver 76 enabling it to pass the contents of output register 72 to data line 74. Also in this condition, flip-flop 88 provides one of two required inputs to AND gate 92. The first group of five transfer pulses following the synchronizing mark is delivered on clock line 84 to AND gate 92, divide-by-twelve circuit 90, and AND circuit 94. Since AND gate 92 is already enabled those five transfer pulses will pass through, stepping out the five bit contents of output register 72 and causing driver 76 to place the five bits on data line 74. The submission of the transfer pulses to divide-by-twelve-circuit 90 causes that circuit to be cycled. When it reaches the divide-by-five state a one is provided to inverter 96 which sets flip-flop 88 causing driver 76 and AND gate 92 to be disabled and ending the transmission from terminal 60 to the receiver device over bidirectional data line 74. The present disabling output from flip-flop 88 is submitted to inverter 98 which provides an enabling input at this time to AND gate 94. Thus the next six transfer pulses appearing on clock line 84 will be passed through AND gate 94 to step six bits of information supplied on bidirectional data line 74 into input register 78. Following this there will be a synchronizing mark which will cause synchronizing mark detector 86 to reset divide-by-twelve circuit 90 and flip-flop 88.

Figure 3:
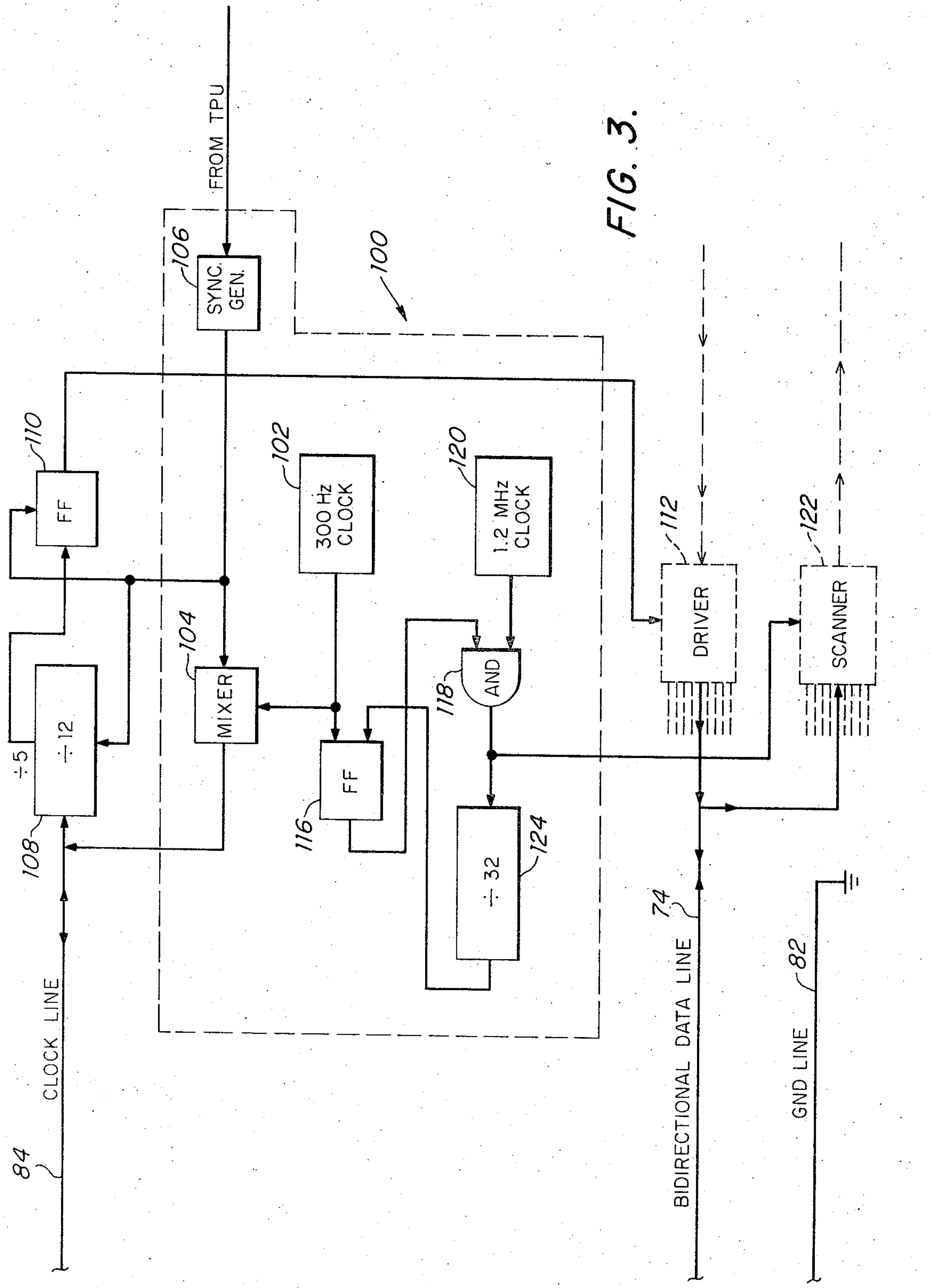
FIG. 3 is a schematic block diagram of a portion of the control system interface located in the receiver device and of a clock circuit according to this invention.

Clock circuit 100, FIG. 3, is used to produce a synchronizing mark plus a recurring sequence of a synchronizing mark followed by eleven transfer pulses. Clock circuit 100 includes a low frequency e.g., 300 Hz clock 102 whose output is combined in mixer 104 with a synchronizing mark produced by synchronizing generator 106 generated internally or as a result of a signal from the terminal processor unit. The signal at the output of mixer 104 is shown labelled Timing Pulses in FIG. 4. The timing pulses include a synchronizing mark followed by eleven transfer pulses including two contiguous groups; the first group contains the five input transfer pulses $I_1$ through $I_5$ which clock data out of output register 72 of terminal 60; the second group includes the six transfer pulses $O_1$ through $O_6$ which clock data into input register 78. The synchronizing mark resets divide-by-twelve circuit 108 and flip-flop 110 in the same manner as it sets divide-by-twelve circuit 90 and flip-flop 88 in terminal 60, FIG. 2. After the first five transfer pulses have been received by divide-by-twelve circuit 108, FIG. 3, the divide-by-five output sets flip-flop 110 and provides a signal to the multiplexer unit driver 112 which enables it to place data signals on the bidirectional data line 74 to each terminal simultaneously.

Each clock pulse from 300 Hz clock 102 in addition to causing mixer 104 to provide a corresponding transfer pulse also sets flip-flop 116. The set output of flip-flop 116 enables AND gate 118 to pass signals from clock 120 at the rate of 1.2 Mhz. These clock pulses occurring at the rate of 1.2 Mhz are submitted to control scanner 122 and are submitted to divide-by-thirty-two circuit 124, which, after it has received 32 such clock pulses, provides a signal to reset flip-flop 116 and disable AND circuit 118. Thus during the duration of each transfer pulse a burst of 32 high frequency pulses is provided to scanner 122: during the period of each transfer pulse which occurs at the rate of 300 Hz there are provided 32 scanning pulses which occur at the rate of 1.2 Mhz. Thus in a system having 32 terminals per multiplexer unit each of those 32 terminals will be scanned by scanner 122 in the multiplexer unit once during each transfer pulse period. The first transfer pulse following the synchronzing mark causes the first bit in each output register 72 of each of the 32 terminals 60 to be scanned by scanner 122. During the second transfer pulse the second bit stored in each output register 72 of each of the 32 terminals 60 is scanned by scanner 122 and so on until during the fifth transfer bit $I_5$, the fifth and last bit of each item of information in each output register 72 of each of the 32 terminals 60 is received by scanner 122. During the next six transfer pulses $O_1 - O_6$ in each scanning cycle six bits from the terminal processor are delivered in the same way on the data line to input register 78.

Other embodiments will occur to those skilled in the art and are within the following claims:

What is claimed is:

1. A control system for transferring items of information over data lines between remote terminals and a receiving device comprising:

a first register in each said terminal for accumulating an item of information to be transferred to said receiving device;

clock means including a clock pulse generator for producing transfer pulses occurring at a first rate, a synchronizing generator for producing synchronizing pulses at a lower rate, and mixer means, responsive to both generators for producing a recurring series of timing pulses including a synchronizing pulse and a number of transfer pulses;

first driver means, responsive to said first register, for delivering said items to a said data line for transfer to said receiving device;

a second register in each said terminal for accumulating an item of information received from said receiving device on a said data line;

first gating means for enabling said first driver means to deliver an item of information from said first register to said receiving device over a said data line in response to a first group of said transfer pulses and for enabling said second register to receive an item of information from said receiving device over a said data line in response to a second group of said transfer pulses;

second driver means in said receiving device for delivering an item of information on a said data line to a said terminal;

scanner means in said receiving device for receiving an item of information from each data line of each terminal in sequence; and second gating means, responsive to said first group of transfer pulses, for enabling said scanner means to receive items of information from a said terminal over a said data line and responsive to said second group of transfer pulses, for enabling said second driver means to deliver an item of information to a said terminal over a said data line.

2. The control system of claim 1 in which said first gating means includes first means for counting the number of transfer pulses following a synchronizing pulse, and first means, responsive to said first means for counting, for distinguishing between the period of said first group of transfer pulses and said second group of transfer pulses.

3. The control system of claim 1 in which said second gating means includes second means for counting the number of transfer pulses following a synchronizing pulse, and second means responsive to said second means for counting, for distinguishing between the period of said first group of transfer pulses and said second group of transfer pulses.

* * * * *